April 9, 1968 A. D. HEIBEL 3,377,557

DEVICE FOR PHASE-RELATIONSHIP ANALYSIS

Filed May 4, 1964

ANTHONY D. HEIBEL

Inventor

By

Atty.

United States Patent Office 3,377,557
Patented Apr. 9, 1968

3,377,557

DEVICE FOR PHASE-RELATIONSHIP ANALYSIS

Anthony D. Heibel, 6767 Wilson Road, Nunica, Mich. 49448

Filed May 4, 1964, Ser. No. 364,563
2 Claims. (Cl. 324—83)

Electrical circuitry frequently provides situations where two alternating-current signals of the same basic frequency are out of phase in some degree. An accurate method for detecting this phase relationship under normal conditions has not been generally available at a reasonable cost, and this invention supplies this need. The phase relationship may be used as a reference for adjusting or compensating the circuit to provide the optimum operating conditions, or the device may be used as a detector to automatically control the compensating system.

An example of the occurrence of a situation involving the phase relationship of two signals of the same frequency is the voltage and current at a load. One of these is selected as the reference, and the problem presented is to separate the other signal into (a) in-phase, and (b) out-of-phase components. Once this is done, suitable compensatory adjustments can be made in the load circuit for optimum power transmission. The D-C signals to the fields of the synchronous motors in power stations can be controlled to reduce reactive power at the load to zero. The system provided by this invention can also be incorporated in laboratory instruments used in wave analysis, and for phase-sensitive voltmeters and wattmeters that are relatively insensitive to temperature variations.

The operation of the unit is based on a novel utilization of the characteristics of a conventional electric multiplying device such as a Hall-effect generator. The output of such a device is essentially composed of (a) a D-C term proportional to the in-phase component of the incoming signal, and (b) a double-frequency A-C term proportional to both the in-phase and the out-of-phase components. The device may be said to multiply the reference and input signals together, and the result by the multiplication factor of the particular unit.

The system provided by this invention proceeds to eliminate the double frequency out-of-phase A-C term, and then multiplies the D-C term preferably by the reference signal to produce an A-C term in-phase with and proportional to the in-phase component of the incoming signal. This product is fed back in opposition to the incoming signal. The gain of the system can be established so that practically all of the in-phase component of the incoming signal is thus blocked out, resulting in the isolation of the out-of-phase component. Readings taken at selected portions of the system will give accurate indications of the separated components.

Figure 1:
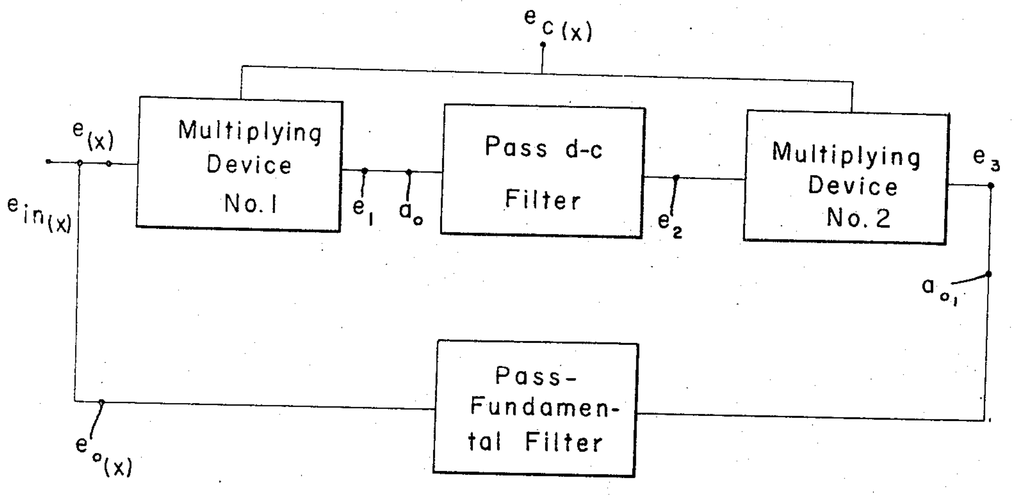
Figure 2:
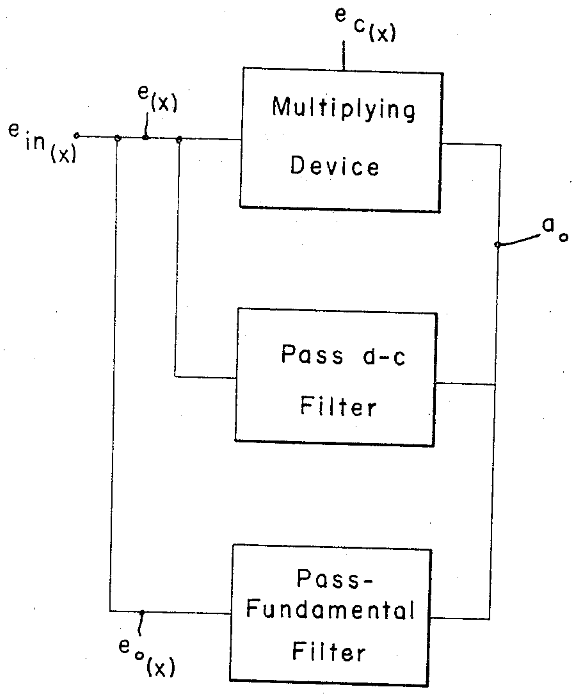

FIGURES 1 and 2 present schematic alternative diagrams showing the relationship of the components of the system. In these diagrams, the following index of terms is to be noted:

$e_{in}$ is the incoming signal being analyzed
$e_c$ is the reference signal
$e_0$ is almost entirely the in-phase component
$e_x$ is almost entirely the out-of-phase component
$x$ is the time function $wt$
$a_0$ and $a_{01}$ are correction quantities representing the departure of the multiplying devices from theoretical characteristics.

In FIGURE 1, the system uses two multiplying devices. In multiplying device No. 1, the input signal is multiplied by the reference signal and by the characteristic gain of the device to produce the D-C term which is proportional to the component of the input signal which is in-phase with the reference signal. The pass D-C filter removes substantially all other terms, and this output is transferred to the second multiplying device. This unit multiplies this D-C term by the reference signal to produce an A-C signal in-phase with and proportional to the in-phase component of the input signal. It is very difficult to prevent the generation of some undesirable harmonics of the basic frequency, and the pass-fundamental filter is inserted to remove these terms. The resulting signal is then fed back against the input signal, and the total gain of the loop is selected so that the magnitude of the feed-back voltage is as close as possible to that of the in-phase component of the input signal. The result of this arrangement is to produce a voltage condition at the points referred to as $e_{(x)}$ on FIGURE 1 which will represent the out-of-phase component of the input signal. A reading at the position indicated as $e_{0(x)}$ will show the in-phase component of the input signal.

The arrangement shown in FIGURE 2 operates on the same general principles, but involves a double-utilization of one multiplying device, rather than using two multiplying devices. The multiplication of the input signal by the reference signal in the multiplying device is admitted to a pass D-C filter to remove the undesirable terms, and the resulting D-C voltage proportional to the in-phase component of the input signal is fed back to the multiplying device. This term is again multiplied by the reference signal, and the result is an A-C term in-phase with and proportional to the in-phase component of the input signal. This term is isolated from undesirable harmonics by the pass-fundamental filter, as in the arrangement shown in FIGURE 1, and is fed back in opposition to the input Isignal. This arrangement provides a position as noted at $e_{(x)}$ where the out-of-phase component of the input signal. This arrangement provides a position as noted phase component will appear.

In a mathematical analysis of this device, it is convenient to refer to both the multiplying devices and the filters as units each having a characteristic gain (G) which is applied to both the out-of-phase (imaginary) component and the in-phase (real) component. $G_{(jw)}$ is a gain applied to a complex number $a+jb$, where $a$ is the in-phase component, and $jb$ the out-of-phase component. (This is common notation.) $G_1$ is associated with the multiplying device No. 1, $G_2$ with the pass D-C filter, $G_3$ with the multiplying device No. 2, and $G_4$ with the pass-fundamental filter. The term epsilon ($\epsilon$), in the following mathematical derivation, indicates an extremely small quantity; $w$ is the angular velocity of the voltage vector in a polar coordinate system, where a full rotation corresponds to the period of the signal; $j$ indicates that the term associated with it is imaginary.

$$x=wt$$

$$\lim_{jw\to 0} G_{2(jw)}=G_2$$

$$G_{2(jw)}=\epsilon_2(x)$$

$$\lim_{jw\to 0} G_{4(jw)}=\epsilon_4$$

$$G_{4(jw)}=\epsilon_{4(x)} \text{ for all } x\geq 2wt$$

$$G_{4(jw)}=G_4 \text{ when } w=\frac{x}{t}$$

$a_0=\epsilon_0=$some D-C offset voltage at the output of $G_{1(jw)}$
$a_{01}=\epsilon_{01}=$some D-C offset voltage at the output of $G_{3(jw)}$
$e_{in(x)}=a\cos x+b\sin x$
$e_{c(x)}=B\sin x$ If $e_{0(x)}$ is a periodic signal with a finite number of ordinary discontinuities, it can always be expanded in a Fourier series as follows:

$$e_{0(x)}=A_0+\sum_{n=1}^{\infty} An\cos nx+\sum_{n=1}^{\infty} Bn\sin nx \qquad (1)$$

$$e_1=[e_{in(x)}+e_{0(x)}]e_{c(x)}\cdot G_1(jw)=\Big[a\cos x\sin x+b\sin x\sin x+A_0\sin x+\sum_{n=1}^{\infty} An\sin x\cos nx+\sum_{n=1}^{\infty} Bn\sin x\sin nx\Big]BG_{1(jw)}$$

$$e_1=\frac{BG_{1(jw)}}{2}\Big\{a\sin 2x+b\cos 2x-b+A_0\sin x+A_1\sin 2x+A_2\sin 3x-A_2\sin x+A_3\sin 4x-A_3\sin 2x+A_4\sin 5x-A_4\sin 3x+\sum_{n=5}^{\infty} An[\sin(n+1)x-\sin(n-1)x]+B_1\cos 2x-B_1+B_2\cos 3x-B_2\cos x+B_3\cos 4x-B_3\cos 2x+B_4\cos 5x-B_4\cos 3x+\sum_{n=5}^{\infty} Bn[\cos(n+1)x-\cos(n-1)x]\Big\} \qquad (2)$$

Let:

$$e_1-\frac{BG_{1(jw)}}{2}(-b-B_1)=F_{(x)} \qquad (3)$$

but;

$$G_{2(jw)}F_{(x)}=\epsilon_{2(x)}F_{(x)} \qquad (4)$$

Also:

$$-G_{2(jw)}(b+B_1)=-G_2(b+B_1) \qquad (5)$$

$$e_2=(e_1+a_0)G_{2(jw)} \qquad (6)$$

Substituting (2), (4), and (5) into (6):

$$e_2=G_{2(jw)}\Big[a_0+\frac{BG_{1(jw)}}{2}(-b-B_1)+e_1+\frac{BG_{1(jw)}}{2}(b+B_1)\Big] \qquad (7)$$

$$e_2=G_2\epsilon_0-\frac{BG_{1(jw)}}{2}(b+B_1)G_2+\epsilon_{2(x)}F_{(x)} \qquad (8)$$

$$e_3=e_{c(x)}G_{3(jw)}e_2=BG_{3(jw)}\Big[G_2\epsilon_0\sin x-\frac{BG_{1(jw)}}{2}G_2\cdot(b+B_1)\sin x+\epsilon_{2(x)}F_{(x)}\sin x\Big] \qquad (9)$$

$$e_{0(x)}=(e_3+a_{0_1})G_{4(jw)} \qquad (10)$$

$$e_{0(x)}=BG_{3(jw)}G_{4(jw)}\Big[G_2\epsilon_0\sin x-\frac{BG_{1(jw)}}{2}G_2(b+B_1)\cdot\sin x+\epsilon_{2(x)}F_{(x)}\sin x\Big]+\epsilon_4\epsilon_{0_1} \qquad (11)$$

Let:

$$\epsilon_0BG_{3(jw)}G_{4(jw)}G_2\sin x+BG_{3(jw)}G_{4(jw)}\epsilon_{2(x)}F_{(x)}\cdot\sin x+\epsilon_4\epsilon_{0_1}=\epsilon_{5(x)} \qquad (12)$$

Then:

$$e_{0(x)}=-B^2G_{1(jw)}G_2G_{3(jw)}G_{4(jw)}(b+B_1)\frac{\sin x}{2}+\epsilon_{5(x)} \qquad (13)$$

Let:

$$\frac{-B^2G_{1(jw)}G_2G_{3(jw)}G_{4(jw)}}{2}=-N_{(jw)} \qquad (14)$$

Then:

$$e_{0(x)}=-N_{(jw)}(b+B_1)\sin x+\epsilon_{5(x)} \qquad (15)$$

Therefore:

$$-N_{(jw)}(b+B_1)\sin x+\epsilon_{5(x)}=A_0+\sum_{n=1}^{\infty} An\cos nx+\sum_{n=2}^{\infty} Bn\sin nx+B_1\sin x \qquad (16)$$

Then:

$$-N_{(jw)}(b+B_1)=B_1 \qquad (17)$$

$$\epsilon_{5(x)}=A_0+\sum_{n=1}^{\infty} An\cos nx+\sum_{n=2}^{\infty} Bn\sin nx \qquad (18)$$

$$B_1(1+N_{(jw)})=-bN_{(jw)} \qquad (19)$$

So that:

$$B_1=-b\left[\frac{1}{\left(1+\frac{1}{N_{(jw)}}\right)}\right] \qquad (20)$$

$$\lim_{N_{(jw)}\to\infty} B_1=-b \qquad (21)$$

With proper choice of circuit components $\epsilon_{5(x)}$ can be made as small as desired.

Therefore:

$$e_{0(x)}\simeq -b\sin x \qquad (22)$$

to whatever degree of accuracy that the perfection of available circuit components will allow.

Since:

$$e_{(x)}=e_{in(x)}+e_{0(x)} \qquad (23)$$

$$e_{(x)}=a\cos x+b\sin x-b\sin\left[\frac{1}{\left(1+\frac{1}{N_{(jw)}}\right)}\right]+\epsilon_{5(x)} \qquad (24)$$

Therefore:

$$e_{(x)}\simeq a\cos x \qquad (25)$$

to whatever degree of accuracy that the perfection of available circuit components will allow. A technique that can be used to determine the stability of the system discussed herein is described in Control System Synthesis, by John G. Truxal (McGraw-Hill Book Co., Inc., 1955) at pages 574–579.

The particular embodiments of the present invention which have been illustrated and discussed herein are for illustrative purposes only, and are not to be considered as a limitation upon the scope of the appended claims. In these claims, it is my intent to claim the entire invention disclosed herein, except as I am limited by the prior art.

I claim:

1. A method of separating an alternating current input signal into components which are in-phase and out-of-phase, respectively, with a reference alternating current signal of the same frequency, comprising:

multiplying said signals together and by a gain factor to produce a direct-current term proportional to the in-phase component of said input signal, and a multiple frequency alternating current term;

filtering out said multiple-frequency alternating current term;

multiplying said direct-current term and said reference alternating-current signal together and by a gain factor to produce an alternating-current term in-phase with and proportional to the in-phase component of said input signal; and feeding back exclusively that portion of said latter alternating-current term having the frequency of said input signal in opposition to said input signal, and selecting the gain of said multiplying functions to substantially isolate said out-of-phase component.

2. A method of separating an alternating-current input signal into components which are in-phase and out-of-phase, respectively, with a reference alternating-current signal of the same frequency, comprising:

multiplying said signals together and by a gain factor to produce a direct-current term proportional to the in-phase component of said input signal, and another term;

filtering out said other term;

multiplying said direct-current term and a reference alternating-current signal together and by a gain factor to produce an alternating-current term in-phase with and proportional to the in-phase component of said input signal; and feeding back exclusively that portion of said latter alternating-current term having the frequency of said input signal in opposition to said input signal.

References Cited

UNITED STATES PATENTS

| | | | |
|---|---|---|---|
| 2,994,037 | 7/1961 | Boyle et al. | 324—83 |
| 3,047,815 | 7/1962 | Boose | 324—83 X |
| 3,084,320 | 4/1963 | Hoffmann et al. | 324—83 X |
| 3,199,037 | 8/1965 | Graves | 324—83 X |
| 3,238,450 | 3/1966 | Palmer | 324—83 |

RUDOLPH V. ROLINEC, *Primary Examiner.*

WALTER L. CARLSON, *Examiner.*

P. F. WILLE, *Assistant Examiner.*